United States Patent [19]

Najjar

[11] Patent Number: 4,784,670
[45] Date of Patent: * Nov. 15, 1988

[54] PARTIAL OXIDATION PROCESS

[75] Inventor: Mitri S. Najjar, Hopewell Junction, N.Y.

[73] Assignee: Texaco Inc., White Plains, N.Y.

[*] Notice: The portion of the term of this patent subsequent to Jun. 9, 2004 has been disclaimed.

[21] Appl. No.: 53,455

[22] Filed: May 22, 1987

Related U.S. Application Data

[63] Continuation-in-part of Ser. No. 803,264, Nov. 29, 1985, Pat. No. 4,671,804.

[51] Int. Cl.$^4$ .............................................. C10J 3/46
[52] U.S. Cl. .................................... 48/197 R; 48/206; 48/DIG. 7
[58] Field of Search ...................... 48/197 R, 206, 210, 48/212, 215, DIG. 7; 110/342; 44/1 R, 15 R, 19; 252/373

[56] References Cited

U.S. PATENT DOCUMENTS

| | | | |
|---|---|---|---|
| 2,830,883 | 4/1958 | Eastman | 48/DIG. 7 |
| 4,436,531 | 3/1984 | Eastbrook et al. | 48/DIG. 7 |
| 4,657,698 | 4/1987 | Najjar et al. | 252/373 |
| 4,671,803 | 6/1987 | Suggitt | 48/197 R |
| 4,671,804 | 6/1987 | Najjar | 48/197 R |
| 4,692,172 | 9/1987 | Stellaccio et al. | 48/197 R |
| 4,705,539 | 11/1987 | Najjar et al. | 48/DIG. 7 |

Primary Examiner—Benoit Castel
Attorney, Agent, or Firm—Robert A. Kulason; James J. O'Loughlin; Albert Brent

[57] ABSTRACT

Synthesis gas is produced by the partial oxidation of a feedstock comprising sulfur-containing petroleum coke and/or liquid hydrocarbonaceous fuel and having ashes that contain nickel and a comparatively low level of silicon. The production of toxic nickel subsulfide ($Ni_3S_2$) in the slag is prevented, and there is substantially no increase in the mole ratio $H_2S+COS/H_2+CO$ in the raw product gas stream by introducing an additive comprising about 2 to 100 wt. % of a sulfur-containing material and any remainder comprising a supplemental iron-containing material into the reaction zone along with the feed. The additive combines with substantially all of the nickel constituents and most of the iron constituents and sulfur found in the feedstock to produce molten slag substantially comprising a fluid sulfide phase and a relatively minor amount of an Fe, Ni alloy phase. In another embodiment, a minor amount of a calcium compound is included with the additive at startup to reduce the softening temperature of the iron-containing addition agent. In still another embodiment, the additive is uniformly dispersed in sulfur-containing petroleum coke having a nickel-containing ash. By this method molten slag free from toxic $Ni_3S_2$ and having a reduced viscosity may be readily removed from the gas generator at a lower temperature. Further, the life of the refractory lining is extended.

26 Claims, No Drawings

PARTIAL OXIDATION PROCESS

This is a continuation-in-part of copending application Ser. No. 803,264, filed Nov. 29, 1985, now U.S. Pat. No. 4,671,804.

FIELD OF THE INVENTION

This invention relates to a process for the partial oxidation of sulfur-containing liquid hydocarbonaceous fuels with a nickel and iron-containing ash or sulfur-containing petroleum coke with a nickel and iron-containing ash, or mixtures thereof to produce gaseous mixtures comprising $H_2+CO$. More particularly it pertains to an additive system for preventing the formation of toxic $Ni_3S_2$ in the ash produced by the partial oxidation of said feedstocks.

The partial oxidation of liquid hydrocarbonaceous fuels such as petroleum products and slurries of solid carbonaceous fuels such as coal and petroleum cok are well known processes. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel, and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process offers an alternative processing route for the coke or the ash-containing liquid hydrocarbonaceous fuel. For example, water slurries of petroleum coke are reacted by partial oxidation in coassigned U.S. Pat. No. 3,607,157. Gasification is often cited as a convenient means of coke disposition. The decision to use gasification as a coke disposal means is generally based on economics. The expected rise in energy costs and legislation requiring total use of feed crude should shortly bring about a great utilization of petroleum coke feeds to the partial oxidation gas generator.

Previous gasification runs with delayed coke and liquid hydrocarboneous fuel gave rise to some unexpected operating problems. For example, a very fine intergrowth of toxic nickel sulfide ($Ni_3S_2$) was found in slag produced by the partial oxidation of sulfur-containing liquid hydrocarbonaceous fuels and/or petroleum coke with said fuels having a nickel-containing ash. Further, the ash which normally melts and is discharged from the gasifier as a slag, was not melting completely and being discharged but was building up on the walls of the refractory. Nickel impurities may under certain conditions form troublesome nickel carbonyl deposits downstream in the system. Fluxing as used in coal operations and in U.S. Pat. Nos. 1,799,885 and 2,644,745 do not provide a solution to applicant's problem involving troublesome vanadium and nickel. The subject invention is an improvement in the art since it permits operation of the partial oxidation gas generator without the production of ash containing toxic nickel sulfide.

SUMMARY OF THE INVENTION

This is a process for the production of gaseous mixtures comprising $H_2+CO$ by the partial oxidation of a feedstock comprising a liquid hydrocarbonaceous fuel containing sulfur and having a nickel and iron-containing ash or petroleum coke containing sulfur and having a nickel and iron-containing ash, or mixtures thereof. Further, said feedstocks include a minimum of 0.01 wt. % of sulfur, such as about 1.0 to 4.5 wt. %; a minimum of 0.5 ppm (parts per million) of nickel, such as about 2.0 to 4000 ppm, a minimum of 0.5 ppm or iron, such as about 2.0 to 2000 ppm; and a minimum of 2.0 ppm of silicon, such as about 5 to 7200 ppm or more. An additive system is provided which prevents the formation of toxic nickel subsulfide ($Ni_3S_2$) in slags generated during the partial oxidation of said feedstocks. Further, there is a reduced amount of Fe, Ni alloy phase in said slag thereby facilitating slag removal from the gasifier. The process includes the steps of (1) mixing together an additive comprising about 2 to 100 wt. % of a supplemental sulfur-containing material and any remainder of the additive comprising a supplemental iron-containing material with said fuel feedstock; wherein the weight ratio of said additive to ash in said fuel feedstock is in the range of about 0.2 to 20.0; and the weight ratio of iron plus sulfur to nickel is said mixture of additive and fuel feedstock is greater than 0.90;

(2) reacting said mixture from step (1) at a temperature in the range of about 1800° F. to 2800° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone said additive combines with substantially all of the nickel and most of the iron constituents and sulfur found in the feedstock to produce said molten slag substantially comprising (i) a fluid sulfide phase comprising the sulfides of iron and nickel having a minimum weight ratio of iron plus sulfur to nickel of 0.70 and a minimum sulfur content of 36 weight percent; (ii) a relatively minor amount of Fe, Ni alloy phase wherein Fe is in the range of about 30 to 95 wt. %, and nickel is in the range of about 5 to 70 wt. %; and (iii) other slag components including silicates, vanadium-containing spinels, and other refractory components; and (3) separating nongaseous materials containing substantially no $Ni_3S_2$ and a reduced amount of said Fe, Ni alloy phase from said hot raw effluent gas stream.

In another embodiment, a mixture of liquid hydrocarbonaceous fuel containing sulfur and having a nickel and iron-containing additive is fed to a coker to produce sulfur-containing petroleum coke with a nickel and iron-containing ash, and with said additive being uniformly dispersed throughout. This petroleum coke is then reacted in the partial oxidation gas generator to produce synthesis gas, reducing gas, or fuel gas.

In still another embodiment, a small amount of calcium compound, such as one selected from the group of compounds of calcium consisting of oxides, sulfides, and mixtures thereof is introduced into the reaction zone. The life of the refractory lining is thereby increased.

DISCLOSURE OF THE INVENTION

The partial oxidation of liquid hydrocarbonaceous fuel and petroleum coke are described respectively in coassigned U.S. Pat. Nos. 4,411,670 and 3,607,156, which are incorporated herein by reference. Further, suitable freeflow refractory lines gas generators and burners that may be used in the production of synthesis gas, reducing gas, or fuel gas from these materials are also described in the aforesaid references. Advantageously, the subject process uses relatively inexpensive feedstocks comprising sulfur-containing liquid hydrocarbonaceous fuel and/or petroleum coke feedstocks having nickel and iron-containing ashes. Further, these feedstocks include a minimum of 0.01 wt. % of sulfur, such as in the range of about 1.5 to 4.5 wt %; a minimum of 0.5 ppm of nickel, such as in the range of about 2.0 to 4000 ppm; a minimum of 0.5 ppm iron, such as in the range of about 2.0 to 2000 ppm; and a minimum of 2.0 ppm of silicon, such as in the range of about 5 to 7200 ppm, or more.

By definition, the term sulfur-containing liquid hydrocarbonaceous material or fuel having a nickel and iron-containing ash is a petroleum or coal derived fuel selected from the group consiting of virgin crude, residua from petroleum distillation and cracking, petroleum distillate, reduced crude, H-Oil fractions, whole crude, asphalt, coal tar, coal derived oil, shale oil, tar sand oil, and mixtures thereof.

By definition, the term sulfur-containing petroleum coke having a nickel and iron-containing ash is petroleum coke made from sulfur-containing liquid hydrocarbonaceous fuel having a nickel and iron-containing ash by conventional coke methods such as by the delayed or fluid coking process, such as described in coassigned U.S. Pat. No. 3,673,080, which is incorporated herein by reference.

Closer study of the ashes derived from the partial oxidation, without an additive, of a feedstock comprising sulfur-containing liquid hydrocarbonaceous fuels and/or petroleum coke having nickel and iron-containing ashes shows that they are largely composed of oxide and sulfide compounds of nickel, vanadium, iron, along with some normally occurring mineral matter species. The metals present in the ash provide a system that is significantly different from that occurring in coal. A further factor is that the total ash content of the petroleum coke or liquid hydrocarbonaceous fuel may be only about one-half to 5 weight percent (wt. %), whereas coal typically contains 10–20 wt. % ash. The comparatively low ash concentration in petroleum coke and liquid carbonaceous fuel may be the reason why the ash removal problem is only noticed after prolonged gasifier runs. The chance for effective ash and additive mixing that is necessary for effective fluxing is therefore greatly reduced.

It is theorized that in the liquid hydrocarbonaceous material and petroleum coke systems, a good deal of the ash material is liberated as individual molecular species. This is because upon vacuum distillation or coking, the metallic species in the crude, which are generally present as porphyrin type structures (metal atoms, oxides or ions thereof confined in an organic framework), are entrapped within the collapsed carbon matrix.

Problems arise when the heavy metal constituents build-up in the system. In particular, vanadium and nickel are known to accumulate on the walls of the refractory lined reaction zone of the partial oxidation gas generator and not flow smoothly from the gasifier under normal gasifier conditions. These materials prove to be very corrosive to refractory thereby decreasing the life of the refractory lining of the reaction zone. These problems and others are minimized by the subject process in which the amount of nickel; constituents remaining in the reaction zone are substantially reduced or eliminated.

This invention provides an improved system comprising a supplemental sulfur-containing material with or without a supplemental iron containing material to prevent the formation of nickel subsulfide ($Ni_3S_2$) in slags generated during the partial oxidation of sulfur, nickel and iron-containing liquid hydrocarbonaceous and/or petroleum coke feedstocks. Without the subject invention, there may be about 0.1 to 5.0 wt. % of troublesome toxic nickel subsulfide and greater than 5 wt. %, such as 8 to 20 wt. % of the Fe, Ni alloy phase in the slag. Further, a means of introducing the addition agent into the system to give maximum effectiveness is provided. In addition, the molten slag is produced with a reduced viscosity in comparison with molten slag produced by the same partial oxidation process but without the addition of said additive. Accordingly, the molten ash may be readily removed from the gas generator at a lower temperature and safely disposed of without contaminating the environment.

Sufficient additive is introduced downwarding into the free-flow refractory lined reaction zone along with the fuel feedstock to provide a wt. ratio of additive to ash in the fuel feedstock in the range of about 0.2 to 20.0, such as about 3.0 to 9.0. This ratio may be also expressed as 3 parts by wt. of additive per part by wt. of ash in the fuel feedstock. The range of supplemental sulfur-containing material in said additive is in the range of about 2 to 100 wt. %, such as about 30 to 70 wt. %; and any remainder of said additive comprises supplemental iron-containing material. Further, the weight ratio of iron plus sulfur to nickel in said additive and fuel feedstock is greater than 0.90, such as in the range of about 1 to 10. In the reaction zone of the partial oxidation gas generator, the additive combines with at least a portion, such as substantially all or a large fraction e.g. about 40 to 100 wt. %, say about 70 to 90 wt. % of the nickel; and most e.g. about 40 wt. % or more of the iron constituents and sulfur found in the feedstock to proeuce molten slag substantially comprising a fluid sulfide phase comprising sulfides of iron and nickel having a minimum sulfur content of 36 wt. %, such as in the range of about 40 to 60 wt. %, and, a relatively minor amount e.g. less than about 1 wt. %, such as about 0.01 to 0.7 wt. % of an Fe, Ni, alloy phase, wherein Fe is present in the range of about 30 to 95 wt. %, such as about 70 to 90 wt. %, and nickel is present in the range of about 5 to 70 wt. %, such as about 10 to 30 wt. %. Other slag components may include silicates, vanadium-containing spinels, and other refractory components. In one embodiment, the amount of sulfur-containing material in the additive is such that the sulfur content in the molten slag leaving the partial oxidation reaction zone is at least equal to 0.36 times the wt. of iron plus nickel in the ash; and, substantially all of the nickel and about 40–95 wt. % of the iron leave the reaction zone in the fluid sulfide phase of the slag. The formation of toxic $Ni_3S_2$ is thereby prevented. Advantageously, by the subject invention there is substantially no (e.g. about 0) nickel subsulfide in the slag.

The liquid sulfide phase materials in the molten slag are very fluid at the temperature prevailing in the reaction zone. The viscosity of these materials at 2000° F. is in the range of about 5 to 100 poises. Further, it was unexpectedly found that these liquid sulfide phase materials have a strong wetting capacity for other metal constituents in the slag, such as the high temperature non-flowing vanadium-containing oxide laths and spinels. These liquid sulfide phase materials function in a completely different manner than that of a typical fluxing additive which may be used for example to solubilize slag constituents in coal. For example, it was unexpectly found that these liquid sulfide phase materials act as a washing agent. They do no solubilize the troublesome vanadium-containing oxide laths and spinels. Rather they serve as a carrier and wash them out of the reaction zone. These washing agents wash at least a portion, such as from about 40 to 100 wt. %, such as about 60 to 80 wt. %, and preferably all of the vanadium-containing contaminants out of the reaction zone of the partial oxidation gas generator. The mixture of these liquid sulfide phase materials, Fe, Ni alloy phase, and vanadium oxide spinels is referred to herein as slag and comprises about 1 to 10 wt. %, such as about 4 to 8 wt. % of vanadium oxide.

Previously, it was unexpectly found that with some low sulfur and/or high silicon containing feedstocks, the Fe-Ni alloy phase was present in an amount greater than 10 wt. % of the slag. This required operating the gasifier at extremely high temperatures e.g. greater than 3000° F. in order to melt the slag so that slag removal may be facilitated. High temperatures increase refractory wear and reduce the efficiency of the process. Advantageously, by adding to the feed supplemental sulfur with or without supplemental iron as provided by the subject invention, the gasifier may be operated at a lower temperature with substantially no Fe, Ni alloy phase and no $Ni_3S_2$ being formed.

In another embodiment of the invention, it was unexpectedly found that the softening temperature of the addition agent could be reduced about 100°–300° F. by introducing a calcium compound along with the addition agent. The calcium compound may be selected from the group consisting of calcium oxide, calcium carbonate and calcium hydroxide. By adding calcium in this manner, the partial oxidation gas generator may be started up at a lower temperature e.g. about 200° to 300° F. lower. The supplemental calcium compound is temporarily introduced into the partial oxidation reaction zone at start-up in admixture with the fuel feedstock and/or addition agent in the critical amount of about 2.0 to 8.0 wt. % or below of the addition agent. By lowering the softening temperature of the addition agent, the calcium compound enhances the rate of sulfur pick-up in the slag. It was found that when the addition of calcium compound exceeded 8.0 wt. % of the addition agent then calcium sulfide and calcium carbonate would clog up the central passage of the dip tube thereby blocking the discharge of the hot effluent gas stream from the reaction zone into the quench water.

Shortly after start-up when the sulfur begins to transfer into the molten slag, the liquid sulfide slag of iron and nickel will lower the softening temperature of the additive thus eliminating thereafter the need of introducing supplemental calcium. Excess calcium will pick up the sulfur to form an undesirable viscous calcium sulfide phase. Keeping the amount of calcium to 8.0 wt. % and below of the addition agent will ensure that the fluid iron and nickel sulfide phase will effectively wash the localized high melting calcium sulfide phase and the high melting vanadium laths and spinels. The use of supplemental calcium in this manner in admixture with the subject additive comprising a supplemental sulfur-containing material with or without a supplemental iron-containing material is substantially different from the use of an ash fluxant, as described in coassigned U.S. Pat. No. 4,277,365.

Advantageously by the subject process, the molten slag which is produced in the reaction zone is free from toxic $Ni_3S_2$ and has a lower viscosity e.g. less than 100 poises at 2000° F., in comparison with prior art high viscosity slag. This facilitates slag removal. Further, at shut-down of the gasifier, the refractory walls of the reaction zone are provided clean with substantially no net accumulation of vanadium contaminants.

The partial oxidation reaction takes place in a reducing atmosphere under the following conditions: temperature—1800° F. to 2800° F., such as about 2300° F. to 2700° F.; say about 2500° F. to 2600° F.; pressure—about 5 to 250 atmospheres, such as about 15 to 200 atmospheres; when steam or water is used as a temperature moderator, the $H_2O$/fuel weight ratio is in the range of about 0.1 to 5.0, such as about 0.2 to 0.9; and the atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 3, COS nil to 0.1, $N_2$ nil to 60, and Ar nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basic total weight of fuel feed). Depending on the composition after removal of the entrained particulate carbon and ash by quench cooling and/or scrubbing with water and with or without dewatering, the gas stream may be employed as synthesis gas, reducing gas or fuel gas.

Another aspect of this invention is that iron-containing material in the subject additive may provide catalytic properties in addition to its use in the generation of the washing agent, as previously described. For example, it may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. Again, however, this invention does not depend on the catalytic properties of the previously described additive.

The preferred supplemental sulfur-containing material in the subject additive for mixing with the sulfur-containing liquid hydrocarbonaceous material having a nickel and iron-containing ash or sulfur-containing petroleum coke having a nickel and iron-containing ash comprises elemental sulfur and/or sulfur materials selected from the group of sulfur-containing material consisting of metal sulfide, metal sulfate, metal sulfites, organic sulfide, ammonium sulfide, sulfur-containing mineral, sulfur-containing slag from the partial oxidation of high-sulfur containing liquid hydrocarbonaceous fuels and solid carbonaceous fuels with or without separation of vanadium and/or other impurities, sulfur-containing liquids and gases, and mixtures thereof. For example, the metal sulfide may be derived from a metal selected from the group consisting of Fe, Mn, Na, K, Ca, and mixtures thereof. Any supplemental iron-containing material in the subject additive comprises elemental iron and/or iron-containing compounds selected from the group of iron-containing compounds consisting of oxides, sulfides, sulfates, carbonates, cyanides, chlorides, nitrates, and iron-containing minerals iron-containing slag from the partial oxidation of hydrocarbonaceous fuels and solid carbonaceous fuels with or without separation of vanadium and/or other impurities, and mixtures thereof. In another embodiment, the supplemental iron-containing compound is a water soluble iron salt. In still another embodiment the supplemental iron-containing compound is a ferro or ferri organic compound selected from the group consisting of naphthenates, oxalates, acetates, citrates, benzoates, oleates, tartrates, and mixtures thereof. In a further embodiment, the iron-containing material in said additive is selected from the group consisting of mill scale, iron-containing materials, iron-containing slag from the partial oxidation of liquid hydrocarbonaceous fuels and solid carbonaceous fuels with or without separation of vanadium and/or other impurites, and mixtures thereof.

In one embodiment of the subject invention, a mixture comprising the aforesaid fuel feedstock comprising sulfur-containing liquid hydrocarbonaceous fuel having a nickel and iron-containing ash and/or the sulfur-containing petroleum coke having a nickel and iron-containing ash, the previously described additive, and optionally said previously described supplemental calcium compound are introduced into the partial oxidation gasifier. In another embodiment, the additive, and optionally said supplemental calcium compound, are mixed with the sulfur-containing liquid hydrocarbonaceous material having a nickel and iron-containing ash. The mixture is then fed into a conventional coking unit to produce petroleum coke. By this means, the finely ground additive, and optionally said supplemental calcium compound may be intimately mixed throughout the petroleum coke product. The comminuted additive, supplemental calcium compound, and the comminuted petroleum coke and mixtures thereof have a particle size so that 100% passes through a sieve of the size ASTM E-11 Standard Sieve Designation in the range of about 425 microns to 38 microns, or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous material or both to produce a pumpable slurry having a solids content in the range of about 50-65 wt. %. Alternatively, the solid materials may be wet ground with the liquid slurry medium. Alternatively, the mixture of particulate solids may be entrained in a gasous medium and then introduced into the gas generator. The gaseous transport medium may be selected from the group consisting of steam, $CO_2$, $N_2$, free-oxygen containing gas, recycle synthesis gas, and mixtures thereof.

In the embodiment wherein ground additive is mixed with the sulfur-containing liquid hydrocarbonaceous fuel having a nickel and iron-containing ash and fed into a coker, the additive may be introduced directly into the ash-containing petroleum liquid feed to the vacuum distillation tower, which normally precedes the coker unit. In either unit operation (coking or distillation), substantially all of the additive should stay behind in the desired bottoms stream. In other words, there should be little, if any, carry over of the additive with the lighter products. A possible advantage for mixing the additive with the vacuum tower feedstream in preference to the bottoms stream (i.e. coker feed) is that the feed to the vacuum tower is significantly less viscous than the bottoms from the vacuum tower. A more thorough mixing may be thereby effected.

For example, a mixture comprising a high boiling liquid petroleum i.e. sulfur-containing heavy liquid hydrocarbonaceous fuel having a nickel and iron-containing ash and the comminuted additive, with or without supplemental calcium compound, at a temperature in the range of about 650° F. to 930° F. is introduced into a delayed coking zone, for example by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead. Petroleum coke in admixture with additive, and optionally the supplemental calcium compound, are removed from the bottom of said delayed coking zone.

In another embodiment, a mixture comprising a sulfur-containing liquid petroleum having a nickel and iron-containing ash and the additive, with or without supplemental calcium compound, at a temperature in the range of about 550° F. to 750° F. is introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperature, will produce the same gasification problems as discussed for coke. Thus, the invention of introducing the previously described additive and optionally supplemental calcium compound as part of the petroleum processing prior to gasification should, depending on the specific process, produce a feedstock that will be free of the gasification problems mentioned above. Many of these processes employ vacuum distillation as pretreatment. Accordingly, as described above, the additive comprising a supplemental sulfur-containing material with or without a supplemental iron-containing material may be mixed with the vacuum distillation feed having a nickel and iron-containing ash. The additives will then emerge from the distillation column in the bottoms stream. In turn, the bottoms stream is the feed stream for the upgrading process. This incorporation of the additive, and optionally the supplemental calcium compound, should not adversely affect these processes, and the addition agents should ultimately emerge with the nickel and iron-containing residue stream from each respective process. In all of these processes, this residue stream should be suitable for gasification by partial oxidation.

EXAMPLES

The following examples are offered as a better understanding of the present invention, but the invention is not to be construed as limited thereto.

EXAMPLE I

Synthesis gas substantially comprising in mole % dry basis $H_2$ 25 to 45, CO 20 to 55, $CO_2$ 5 to 35, $CH_4$ 0.06 to 8.0, and $H_2S$+COS nil to 3.0 is produced in a free-flow refractory lined partial oxidation reaction zone, such as that shown and described in coassigned U.S. Pat. No. 3,607,157, which is incorporated herein by reference.

The feedstock comprises an atomized aqueous dispersion or a dispersion of substantially dry sulfur-containing petroleum coke having a nickel and iron-containing ash and being entrained in a gaseous transport medium comprising a mixture of free-oxygen containing gas and steam. The ash in the petroleum coke comprises about 29.0 wt. % of nickel, and about 8.0 wt. % iron, and contains less than about 12 wt. % silicon. About 1.4 wt. % sulfur is present in the petroleum coke. The petroleum coke has uniformly dispersed therein an additive comprising about 53 wt. % of iron oxide and 47 wt. % of elemental sulfur. The wt. ratio of additive to ash is about 10.8 to 1. The weight ratio of iron plus sulfur to nickel in the reaction zone is about 20 to 1. In another run the sulfur-containing petroleum coke having a nickel and iron-containing ash and being in admixture with the previously described additive plus supplemental calcium is introduced into the free-flow partial oxidation zone as a pumpable slurry of petroleum coke in water. The solids content of the slurry is about 62.5 weight percent.

The petroleum coke is reacted with a free-oxygen containing gas e.g. air, in the presence of a temperature moderator e.g. $H_2O$, in the refractory lined partial oxidation reaction zone at an autogenous temperature of about 2450° F. and a pressure of about 6 atmospheres. The molten slag droplets are readily separated from the hot effluent gas stream leaving the reaction zone by gravity or by quenching and/or scrubbing the gas stream with water or other gas scrubbing medium. The ash fusion temperature (°F.) for the slag is below 2030.

In comparison, the ash fusion of the coarse slag with no iron and sulfur-containing additive is greater than 2750° F. There is no toxic $N_3S_2$ in the slag and there is less than 1.0 wt. % Fe, Ni alloy. The chemical composition of the slag in wt. % is shown in Table I below.

TABLE I

Chemical Composition of Slag

| FeS | NiS | FeO | CaO | CaS | $SiO_2$ | $V_2O_3$ | Others[1] | Fe,Ni Alloy |
|---|---|---|---|---|---|---|---|---|
| 62.3 | 3.7 | 25.7 | 0.3 | 0.8 | 2.3 | 1.50 | 3.2 | 0.2 |

[1]minor ash components and refractory pick-up

EXAMPLE II

Aqueous slurries of sulfur-containing delayed petroleum coke having a nickel and iron-containing ashes and having a solid content of about 62.5 wt. % were subjected to partial oxidation in a free-flow reaction zone. The ash content of the petroleum coke feedstock is 0.39 wt. %. Run No. 1 was made with no additive. Run No. 2 was made with an additive comprising an iron-containing material e.g. iron oxide. No. 3 was made with an additive comprising a sulfur-containing material e.g. elemental sulfur and an iron-containing material e.g. iron oxide. The operating conditions and results are summarized in Table II.

TABLE II

| Run No. | Additive | Sulfur in Feed and additive wt. % (Basis wt. of feed) | Sulfur added wt. % (Basis wt. of feed) | Fe added wt. % (Basis wt. of feed) | Temp. of Reaction Zone °F. | Fe,Ni Alloy Phase in Slag wt. % (Basis wt. of slag) | Toxic $Ni_3S_2$ in Slag wt. % (Basis wt. of slag) |
|---|---|---|---|---|---|---|---|
| 1 | None | 1.4 | 0 | 0 | 2980 | 0.5 | 1.2 |
| 2 | Iron Oxide | 1.4 | 0 | 2.4 | 2780 | 13.8 | 0 |
| 3 | Iron Oxide + Sulfur | 4.0 | 2.6 | 2.4 | 2450 | 0.2 | 0 |

From the data in Table II, it is clearly evident from Run. No. 3 that by introducing into the partial oxidation gas generator the subject additive comprising a sulfur-containing material and an iron-containing material along with a petroleum coke feedstock, there is a substantial reduction of the Fe, Ni, alloy phase in the slag. The viscosity of the slag is thereby reduced, and the gas generator may be run at a lower temperature. The molten slag is removed from the gasifier containing substantially no toxic $Ni_3S_2$.

Various modifications of the invention as herein before set forth may be made without departing from the spirit and scope thereof, and therefore, only such limitations should be made as are indicated in the appended claims.

I claim:

1. A process for the production of gaseous mixtures comprising $H_2$+CO by the partial oxidation of a feedstock comprising sulfur-containing liquid hydrocarbonaceous fuel and/or petroleum coke, said fuels having nickel and iron-containing ashes, or mixtures thereof; and said feedstock includes a minimum of 0.01 wt. % of sulfur; a minimum of 0.5 ppm nickel, a minimum of 0.5 ppm iron, and a minimum of 2.0 ppm of silicon; said process comprising:
   (1) mixing together an additive comprising about 2 to 100 wt% of a supplemental sulfur-containing material and about 0 to 98 wt. % of a supplemental iron-containing material with said fuel feedstock;

wherein the weight ratio of additive to ash in said fuel feedstock is in the range of about 0.2 to 20.0; and the weight ratio of iron plus sulfur to nickel in said mixture of additive and fuel feedstock is greater than 0.90;

(2) reacting said mxiture from step (1) at a temperature in the range of about 1800° F. to 2800° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone said additive combines with substantially all of the nickel and most of the iron constituents and sulfur found in the feedstock to produce said molten slag substantially comprising (i) a fluid sulfide phase comprising the sulfides of iron and nickel having a minimum weight ratio of iron plus sulfur to nickel of 0.70 and a minimum sulfur content of 36 weight percent; (ii) a relatively minor amount of Fe, Ni alloy phase wherein Fe is in the range of about 30 to 95 wt. %, and nickel is in the range of about 5 to 70 wt%. and (iii) other slag components including silicates, vanadium-containing spinels, and other refractory components; and (3) separating nongaseous materials containing substantially no $Ni_3 S_2$ and a reduced amount of said Fe, Ni alloy phase from said hot raw effluent gas stream.

2. The process of claim 2 wherein the additive in step (1) includes an iron-containing material comprising elemental iron and/or iron compounds selected from the group of iron compounds consisting of oxides, sulfides, sulfates, carbonates, cyandies, chlorides, nitrates, and mixtures thereof; and said sulfur-containing material comprises elemental sulfur and/or sulfur-containing materials selected from the group of sulfur containing materials consisting of metal sulfide, metal sulfate, metal sulfite, organic sulfide, sulfur-containing mineral, sulfur-containing slag from the partial oxidation of high-sulfur containing liquid hydrocarbonaceous fuels and solid carbonaceous fuels with or without separation of vanadium and/or other impurities, sulfur-containing liquids and gases, and mixtures thereof.

3. The process of claim 1 wherein any iron-containing material in said additive is selected from the group consisting of mill scale, iron-containing minerals, iron-containing slag from the partial oxidation of liquid hydrocarbonaceous fuels and solid carbonaceous fuels with or without separation of vanadium and/or other impurities, and mixtures thereof.

4. The process of claim 2 wherein said metal sulfide is derived from a metal selected from the group consisting of Fe, Mn, Na, K, Ca, and mixtures thereof.

5. The process of claim 1 wherein the additive in step (1) includes a material selected from the group of ferro or ferri organic compounds consisting of naphthenates, oxalates, acetates, citrates, benzoates, cleates, tartrates, and mixtures thereof.

6. The process of claim 1 wherein the additive in step (1) includes an iron-containing material comprising a water soluble iron salt.

7. The process of claim 1 wherein said sulfur-containing liquid hydrocarbonaceous fuel having a nickel and iron-containing ash feedstock is selected from the group consisting of crude residue from petroleum distillation and cracking process operations, pertroleum distillate, reduced crude, H-Oil fractions, whole crude, asphalt, coal tar, coal derived oil, shale oil, tar sand oil, and mixtures thereof.

8. The process of claim 1 wherein said sulfur-containing liquid hydrocarbonaceous fuel having a nickel and iron-containing ash is a pumpable slurry of petroleum coke in water, liquid hydrocarbon fuel or mixtures thereof.

9. The process of claim 1 where in step (1) said additive is introduced into the feed to or the bottoms from a vacuum distillation unit.

10. The process of claim 1 wherein said mixture of additive and feedstock from step (1) has a particle size so that about 100% passes through a sieve of the size ASTM E-11 Standard Sieve Designation in the range of about 425 microns to 38 microns, or below.

11. The process of claim 1 wherein substantially all of the sulfur in said feedstock is converted into the sulfides of iron and nickel and leaves the reaction zone in the slag.

12. The process of claim 1 wherein a supplemental calcium compound in the amount of about 2.0 to below 8.0 wt. % of said additive is only introduced into the reaction zone of the partial oxidation reaction zone at start-up to reduce the softening temperature of said additive, and then discontinued.

13. The process of claim 1 wherein said additive is a comminuted mixture comprising in wt. %, iron oxide about 0 to 98, and elemental sulfur about 2 to 100.

14. The process of claim 1 provided with the step of mixing supplemental sulfur-containing material with the other materials in step (1) so that the sulfur content in the molten slag in step (2) is at least equal to 0.36 times the wt. of iron plus nickel in the ash and substantially all of the nickel and about 40–95 wt. % of the iron leave the reaction zone in the fluid sulfide phase of the slag.

15. The process of claim 1 wherein the molten slag in step (2) is produced with a reduced viscosity in comparison with molten slag produced by the same partial oxidation process but without the addition of said additive.

16. A process for the production of gaseous mixtures comprising $H_2+CO$ by the partial oxidation of a fuel feedstock comprising a sulfur-containing liquid hydrocarbonaceous fuel having a nickel and iron-containing ash; and said feedstock includes a minimum of 0.01 wt. % of sulfur; a minimum of 0.5 ppm nickel, a minimum of 0.5 ppm iron, and a minimum of 2.0 ppm of silicon; said process comprising:

(1) mixing together an additive comprising about 2 to 100 wt. % of a supplemental sulfur-containing material and about 0 to 98 wt. % of a supplemental iron-containing material with said fuel feedstock; wherein the weight ratio of additive to ash in said fuel feedstock is in the range of about 0.2 to 20; and the weight ratio of iron plus sulfur to nickel in said mixture of additive and fuel feedstock is greater than 0.90;

(2) coking said mixture from step (1) to produce sulfur-containing petroleum coke having a nickel-containing ash and having dispersed therein said additive from step (1);

(3) introducing the petroleum coke from step (2) into the partial oxidation reaction zone in step (4) as a pumpable slurry of petroleum coke in water, liquid hydrocarbonaceous fluid or mixtures thereof, or as substantially dry petroleum coke entrained in a gaseous transport medium;

(4) reacting said mixture from step (3) at a temperature in the range of about 1800° F. to 2800° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone said additive combines with substantially all of the nickel and most of the iron constituents and sulfur found in the feedstock to produce said molten slag substantially comprising (i) a fluid sulfide phase comprising the sulfides of iron and nickel having a minimum weight ratio of iron plus sulfur to nickel of 0.70 and a minimum sulfur content of 36 weight percent; (ii) a relatively minor amount of Fe, Ni alloy phase wherein Fe is in the range of about 30 to 95 wt. %, and nickel is in the range of about 5 to 70 wt. %; and (iii) other slag components including silicates, vanadium-containing spinels, and other refractory components; and (5) separating nongaseous materials containing substantially no $Ni_3S_2$ and a reduced amount of said Fe, Ni alloy phase from said hot raw effluent gas stream.

17. The process of claim 16 wherein the additive in step (1) includes an iron-containing material comprising elemental iron and/or iron compounds selected from the group of iron compounds consisting of oxides, sulfides, sulfates, carbonates, cyanides, chlorides, nitrates, and mixtures thereof; and said sulfurcontaining material comprises elemental sulfur and/or sulfurcontaining material selected from the group of sulfur-containing materials consisting of metal sulfide, metal sulfate, metal sulfite, organic sulfide, sulfur-containing mineral, sulfur-containing slag from the partial oxidation of high-sulfur containing hydrocarbonaceous fuels and solid carbonaceous fuels with or without separation of vanadium and/or other impurities, sulfur-containing liquids and gases, and mixtures thereof.

18. The process of claim 16 wherein the additive in step (1) include an iron-containing material selected from the group consisting of mill scale, iron-containing minerals, iron-containing slag from the partial oxidation of liquid hydrocarbonaceous fuels and solid carbonaceous fuels with or without separation of vanadium and/or other impurities, and mixtures thereof.

19. The process of claim 16 wherein said additive and feedstock from step (1) has a particle size so that 100% passes through a sieve of the size ASTM E-11 Standard Sieve Designation in the range of about 425 microns to 38 microns or below.

20. The process of claim 16 wherein the additive in step (1) includes an inorganic or organic compound of iron.

21. The process of claim 16 wherein said sulfur-containing liquid hydrocarbonaceous fuel having a nickel-containing ash is a high boiling liquid petroleum feed to or the bottoms from a vacuum tower or a fractionator.

22. The process of claim 16 wherein the coking in step (2) comprises introducing the mixture from step (1) at a temperature in the range of about 650° F. to 930° F. into a delayed coking zone where at a temperature in the range of about 800° F. to 895° F. and a pressure in the range of about 20 to 60 psig, uncondensed hydrocarbon effluent vapor and steam are removed overhead and said sulfur-containing petroleum coke having a nickel and iron-containing ash and having uniformly dispersed therein said additive is removed from the bottom.

23. The process of claim 16 where in step (2) the mixture from step (1) at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead and said petroleum coke with said additive uniformly dispersed therein is removed from the bottom.

24. The process of claim 16 where in step (5) said nongaseous materials are separated from said hot effluent gas stream by contacting the hot raw effluent gas stream from step (4) with a water or oil scrubbing medium.

25. The process of claim 16 wherein substantially all of the sulfur in said feedstock is converted into the sulfides of iron and nickel and leaves the reaction zone in the slag.

26. The process of claim 16 wherein a supplemental calcium compound in the amount of about 2.0 to 8.0 wt. % of said additive is introduced into the reaction zone of the partial oxidation reaction zone only at start-up to reduce the softening temperature of the additive and then the introduction of said calcium compound is discontinued.

* * * * *